United States Patent [19]

Mori

[11] Patent Number: 5,157,971
[45] Date of Patent: Oct. 27, 1992

[54] METHOD OF DETECTING A TAPE THICKNESS AND A WINDING DIAMETER OF A SUCCESSIVE MAGNETIC TAPE

[75] Inventor: Takeo Mori, Kodaira, Japan

[73] Assignee: Nakamichi Corporation, Kodaira, Japan

[21] Appl. No.: 852,902

[22] Filed: Mar. 18, 1992

Related U.S. Application Data

[63] Continuation of Ser. No. 609,402, Nov. 5, 1990, abandoned.

[30] Foreign Application Priority Data

Nov. 10, 1989 [JP] Japan .................. 1-293347

[51] Int. Cl.$^5$ ............................................. G11B 15/52
[52] U.S. Cl. .................. 73/432.1; 360/73.14; 242/186
[58] Field of Search ............... 73/432.1, 865.8; 33/1 SP, 701, 712, 732–734, 754; 360/73.01–73.04, 73.14; 242/186

[56] References Cited

U.S. PATENT DOCUMENTS

| | | | |
|---|---|---|---|
| 4,738,950 | 4/1988 | Goker et al. | 360/73.14 |
| 4,977,466 | 12/1990 | Nakata | 360/73.08 |
| 4,985,786 | 1/1991 | Arai et al. | 360/70 |
| 5,085,379 | 2/1992 | Uchikoshi et al. | 360/73.14 |

*Primary Examiner*—Robert Raevis
*Attorney, Agent, or Firm*—Pearne, Gordon, McCoy & Granger

[57] ABSTRACT

A method of detecting a tape thickness d and/or a winding diameter Rs of a successive magnetic tape wound on first and second reels therebetween comprising determining a first rotational number $C_1$ of the first reel indicating variation in a winding number of the magnetic tape on the first reel and a second rotational number $C_2$ of the second reel indicating variation in a winding number of the magnetic tape on the second reel and a winding radii of the first and second reels reel being Ro and Rs, respectively, when the first and second rotational numbers $C_1$ and $C_2$ are zero, while the magnetic tape is being transferred between a first winding state at which the first and second rotational numbers $C_1$ and $C_2$ are $C_1a$ and $C_2a$ and a second winding state at which the first and second rotational numbers $C_1$ and $C_2$ are $C_1b$ and $C_2b$, determining the tape thickness d from an expression (1);

$$d = (-G \cdot M + E \cdot N)/(E \cdot H - F \cdot G) \quad (1)$$

and determining the winding radius Rs from an expression (2), $$Rs = (H \cdot M - F \cdot N)/(E \cdot H - F \cdot G) \quad (2)$$

wherein E is equal to $2C_2a$, F is equal to $-(C_1a^2 + C_2a^2)$, G is equal to $2C_2b$, H is equal to $-(C_1b^2 + C_2b^2)$, M is equal to $2C_1aRo$, and N is equal to $2C_1bRo$.

2 Claims, 2 Drawing Sheets

METHOD OF DETECTING A TAPE THICKNESS AND A WINDING DIAMETER OF A SUCCESSIVE MAGNETIC TAPE

This is a continuation of application Ser. No. 07/609,402, filed Nov. 5, 1990, now abandoned.

BACKGROUND OF THE INVENTION

There has been proposed a method for detecting a thickness of a magnetic tape in which reel periods are determined at different winding states of a successive magnetic tape wound on supplying and winding reels and an operation is made on the determined reel periods.

As shown in FIG. 3, a winding radius Rs of a supplying reel 1 before a magnetic tape 3 begins to be transferred from the supplying reel 1 to a winding reel 2 can be determined by a ratio of rotational numbers of the respective reels when a predetermined length of the magnetic tape is transferred, if the winding radius Ro of the winding reel 2 is known.

However, the prior art method has a disadvantage in which the reel periods at the different winding states for determining the tape thickness should be detected under a condition where the tape transferring velocities at the respective winding states are equal to each other.

Furthermore, when the winding radius Rs of the supplying reel before the magnetic tape begins to be transferred is to be determined, the precision of a ratio of the rotational numbers of the respective reels depends upon a number of pulses for detecting the respective reel rotational states. Therefore, many rotational numbers of the reels are required. However, with so many rotational numbers of the reels to be detected, the tape winding radius of the respective reels tends to vary during the detection thereof. As a result, the detected ratio of the rotational numbers of the reels corresponds to a ratio of average values of the winding radius of each of the reels varying during the pulse detection. Thus, it will be noted that the winding radius Rs of the supplying reel before the magnetic tape begins to be transferred cannot be precisely determined.

SUMMARY OF THE INVENTION

Accordingly, it is a principal object of the invention to provide a method adapted to precisely determine a thickness of a successive magnetic tape even though tape transfer velocities are different.

It is another object of the invention to provide a method adapted to precisely determine a winding radius of one of first and second reels on which a successive magnetic tape is wound therebetween even though tape transfer velocities are different.

It is a further object of the invention to provide a method adapted to precisely determine a winding radius of one of first and second reels on which a successive magnetic tape is wound therebetween even though their winding radii on the winding conditions are different.

In accordance with one aspect of the present invention, there is provided a method for detecting a thickness d of a successive magnetic tape wound on first and second reels therebetween comprising the steps of;

determining a first rotational number $C_1$ of said first reel indicating variation in a winding number of said magnetic tape on said first reel and a second rotational number $C_2$ of said second reel indicating variation in a winding number of said magnetic tape on said second reel and a winding radius of said first reel being $R_0$ when said first and second rotational numbers $C_1$ and $C_2$ are zero, while said magnetic tape is being transferred between a first winding state at which said first and second rotational numbers $C_1$ and $C_2$ are $C_1a$ and $C_2a$ and a second winding state at which said first and second rotational numbers $C_1$ and $C_2$ are $C_1b$ and $C_2b$;

and determining said tape thickness d from a following expression;

$$d = (-G \cdot M + E \cdot N)/(E \cdot H - F \cdot G)$$

wherein E is equal to $2C_2a$, F is equal to $-(C_1a^2 + C_2a^2)$, G is equal to $2C_2b$, H is equal to $-(C_1b^2 + C_2b^2)$, M is equal to $2C_1aR_0$, and N is equal to $2C_1bR_0$.

In accordance with another aspect of the present invention, there is provided a method for detecting a winding radius Rs of a successive magnetic tape wound on first and second reels therebetween comprising the steps of;

determining a first rotational number $C_1$ of said first reel indicating variation in a winding number of said magnetic tape on said first reel and a second revolution $C_2$ of said second reel indicating variation in a winding number of said magnetic tape on said second reel and winding radii of said first and second reels being $R_0$ and Rs, respectively when said first and second revolutions $C_1$ and $C_2$ are zero, while said magnetic tape is being transferred between a first winding state at which said first and second revolutions $C_1$ and $C_2$ are $C_1a$ and $C_2a$ and a second winding state at which said first and second rotational numbers $C_1$ and $C_2$ are $C_1b$ and $C_2b$;

and determining said winding radius Rs of said second reel when $C_1$ and $C_2$ are zero from a following expression;

$$Rs = (H \cdot M - F \cdot N)/(E \cdot H - F \cdot G)$$

wherein E is equal to $2C_2a$, F is equal to $-(C_1a^2 + C_2a^2)$, G is equal to $2C_2b$, H is equal to $-(C_1b^2 + C_2b^2)$, M is equal to $2C_1aR_0$, and N is equal to $2C_1bR_0$.

BRIEF DESCRIPTION OF THE DRAWINGS

The above and other objects and features of the invention will be apparent from the description of the embodiment of the invention with reference to the accompanying drawings in which.

DETAILED DESCRIPTION OF THE EMBODIMENTS

Figure 1:
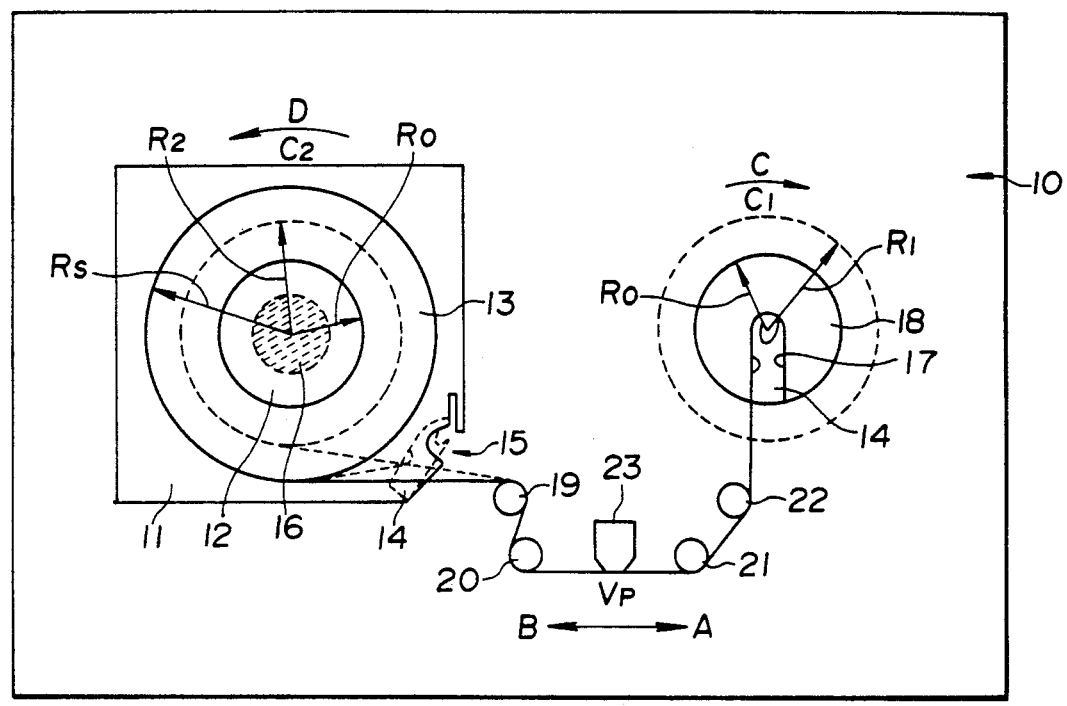
FIG. 1 is a schematic diagram of a magnetic recording and reproducing apparatus suitable for applying the methods of the invention.
Figure 3:
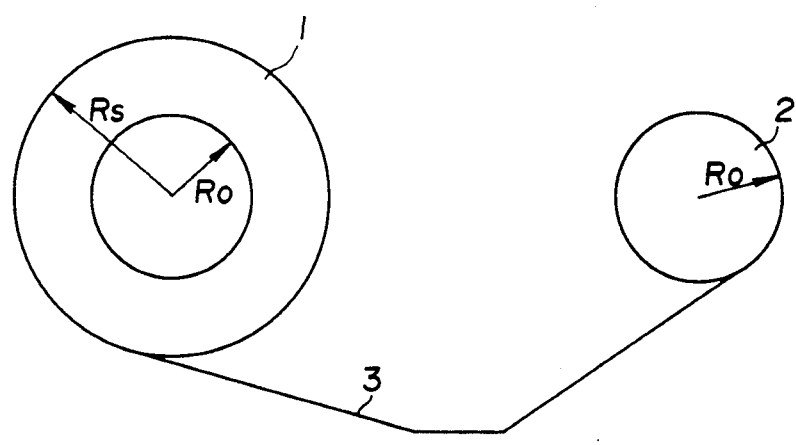
FIG. 3 illustrates how a thickness and a winding radius of a supplying reel are determined.

Referring now to FIG. 1, there is illustrated a magnetic recording and reproducing apparatus 10 suitable for using the methods of the invention. A cartridge 11 comprises a reel 12 (referred to as a C reel hereinjustbelow) disposed within the cartridge 11 and having a radius of $R_0$, a magnetic tape 13 wound on the C reel 12 and a leader block 14 removably provided at an opening 15 in the cartridge 11 while it holds an end of the magnetic tape 13. The cartridge 11 is brought to a position shown in FIG. 1 by loading means of the magnetic recording and reproducing apparatus 10 not shown.

A shaft of the C reel 12 is connected to a shaft of a supplying reel 16 provided in the magnetic recording and reproducing apparatus 10 so that they rotate together with each other. The leader block 14 is removed from the cartridge 11 by means of leader block guide means not shown, passes through predetermined passage and engages a recess 17 in a winding reel 18 having a radius of $R_0$ and provided in the magnetic recording and reproducing apparatus 10 so that they rotate together with each other. As shown in FIG. 1, a path through which the magnetic tape 13 moves is defined by tape guides 19, 20, 21 and 22 so that the magnetic tape 13 slidably engages a magnetic head 23.

It is supposed that at an initial state where the leader block 14 is brought to engage the recess 17 in the winding reel 18, a winding radius of the C reel 12 is Rs and a winding radius of the winding reel 18 is $R_0$, which is substantially equal to a radius of the winding reel 18. It is also supposed that at a state where the magnetic tape 13 is transferred by a distance 1 from the initial state, the winding radii of the winding reel 18 and the C reel 12 and $R_1$ and $R_2$, respectively and that numbers of directional rotation by which the reels rotate until the magnetic tape 13 is transferred by the distance 1 are $C_1$ and $C_2$, respectively.

Both of the rotational numbers $C_1$ and $C_2$ are set at zero at the initial state, increases having different increasing rates as the magnetic tape 13 is transferred in a forward direction as indicated by an arrow of A and decreases having different decreasing rates in a reverse direction as indicated by an arrow of B.

Under such settings, how a thickness d of the magnetic tape 13 and the winding radius Rs of the C reel 12 at the initial state are determined will be described hereinbelow.

The winding radii $R_1$ and $R_2$ of the respective reels 18 and 12 at an arbitrary point are expressed as follows;

$$R_1 = R_0 + C_1 d \quad (1)$$

$$R_2 = Rs - C_2 d \quad (2)$$

In view of areas of winding layers on both of the reels 12 and 18 based on the thickness d of the magnetic tape 13, the following expression will be established;

$$\pi(Rs^2 + R_0^2) = \pi(R_1^2 + R_2^2) \quad (3)$$

As $R_1$ and $R_2$ in the expression (3) are replaced by the expressions (1) and (2), an arranged expression will be as follows;

$$2C_2 Rs - (C_1^2 + C_2^2)d = 2C_1 R_0 \quad (4)$$

Since a relationship of the expression (4) is established between the rotational numbers of the reels, supposing that at the state where the magnetic tape 13 is transferred by a distance $1a$, the rotational numbers of the reels 18 and 12 are $C_1a$ and $C_2a$, respectively while at a state where the magnetic tape 13 is transferred by a distance $1b$, the rotational numbers of the reels 18 and 12 are $C_1b$ and $C_2b$, respectively, then the following expressions will be established;

$$2C_2a Rs - (C_1a^2 + C_2a^2)d = 2C_1a R_0 \quad (4')$$

and $$2C_2b Rs - (C_1b^2 + C_2b^2)d = 2C_1b R_0 \quad (4'')$$

Thus, by solving simultaneous equations of the expressions (4') and (4''), the thickness d of the magnetic tape 13 and the winding radius Rs of the C reel 12 will be determined as follows;

$$Rs = (H \cdot M - F \cdot N)/(E \cdot H - F \cdot G) \quad (5)$$

$$d = (-G \cdot M + E \cdot N)/(E \cdot H - F \cdot G) \quad (6)$$

wherein E is equal to $2C_2a$, F is equal to $-(C_1a^2 + C_2a^2)$, G is equal to $2C_2b$, H is equal to $-(C_1b^2 + C_2b^2)$, M is equal to $2C_1a R_0$, and N is equal to $2C_1b R_0$.

Figure 2:
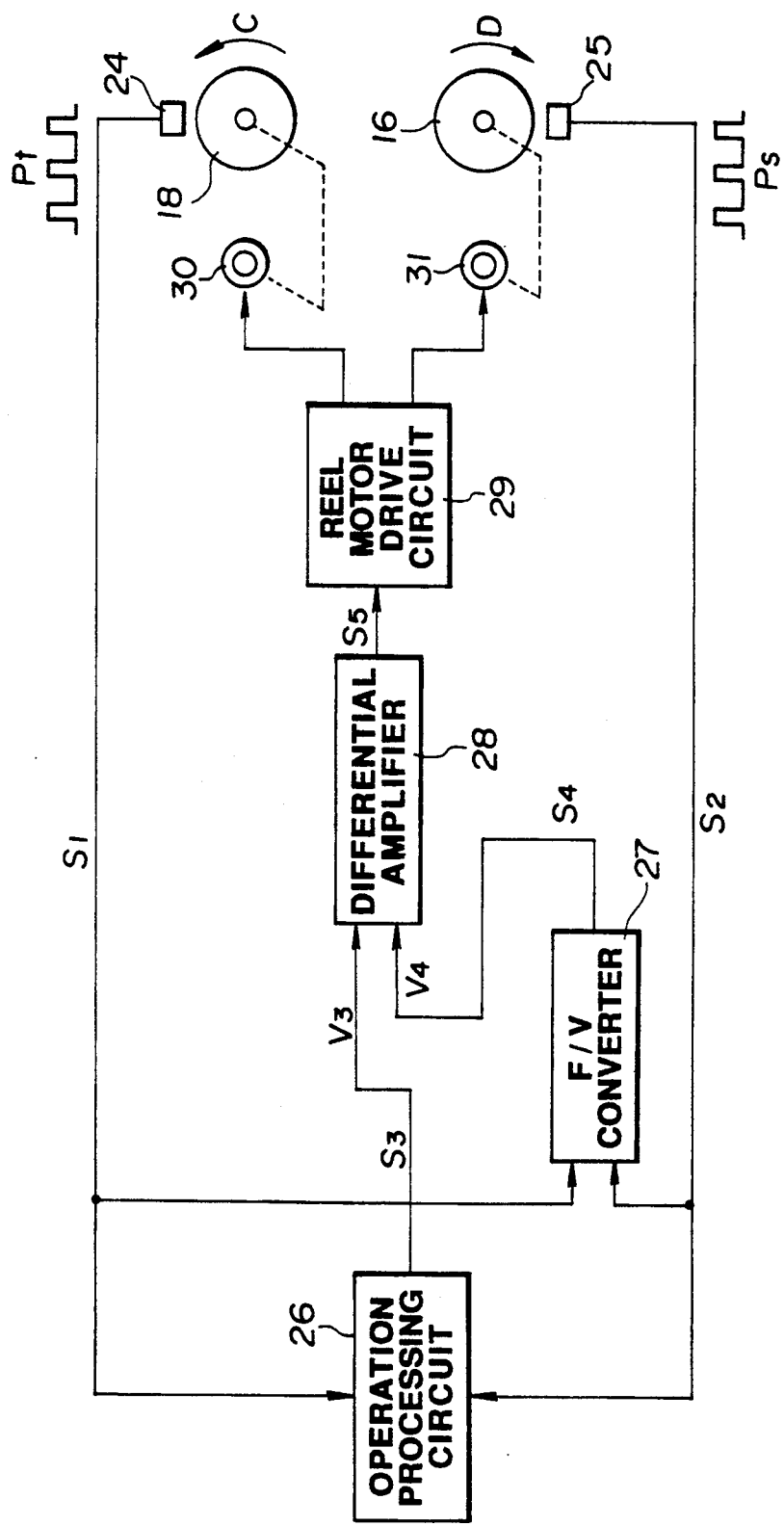
FIG. 2 illustrates an example of a circuit for making operations according to the methods of the invention.

FIG. 2 illustrates an operational circuit for making the aforementioned operations.

In the operational circuit of FIG. 2, a rotation detector 24 disposed near the winding reel 18 associates with a detected member (not shown) in the winding reel 18 to generate a pulse every $1/n$ revolution fo the winding reel 18 and therefore n pulses Pt during a revolution of the winding reel 18 and to output a rotation detection signala $s_1$ to an operation processing circuit 26 and a frequency to voltage converter (referred to as F/V converter hereinbelow) 27.

A rotation detector 25 disposed near the supplying reel 16 also detects rotations of the supplying reel 16 to generate n pulses Ps during a revolution of the supplying reel 16 and to output a rotation detection signal $s_2$ to the operation processing circuit 26 and the F/V converter 27.

In FIG. 2, the rotational directions C and D of the reels 18 and 16 correspond to the rotational directions C and D of the reels 18 and 16 of FIG. 1, respectively.

The operation processing circuit 26 includes two counters to count the detected pulses Pt and Ps of the rotation detection signals $s_1$ and $s_2$, respectively, which monitor the rotational directions of the reels to count up when the reels 18 and 16 rotate in the directions of C and D and to count down when they rotate in the reverse directions.

Since both of the counters are reset at the initial state, relations between the counted values $P_1$ and $P_2$ of the pulses Pt and Ps and the rotational numbers $C_1$ and $C_2$ of the winding reel 18 and the C reel 12 are as follows;

$$C_1 = P_1/n, \quad C_2 = P_2/n$$

A control signal $s_3$ is output from the operation processing circuit 26 to set a tape transfer velocity at a desired value. An operation method of the tape transfer velocity is disclosed by Japanese Patent Application No. 116,848/1989 which was filed by the applicant.

According to the disclosed operation method, if $\alpha = C_2/C_1$, $\beta = Rs/R_0$, $x = R_1/R_0$ and $y = R_2/R_0$ are supposed, y and x may be expressed as follows;

$$y = (2\alpha + \beta - \alpha^2 \beta)/(\alpha^2 + 1)$$

$$x = (\alpha^2 + 2\alpha\beta - 1)/(\alpha^2 + 1)$$

If it is supposed that a tape transport velocity at the time when the tape 13 is transported by distance 1 is V, then the rotational angular velocities $w_1$ and $w_2$ of the winding reel 18 and the supply reel 13, respectively, are determined by the following expressions:

$$w_1 = V/R_1 = V/(x \cdot R_0)$$

$$w_2 = V/R_2 = V/(y \cdot R_0)$$

A sum of rotational angular velocities $\omega_1$, $\omega_2$ of the winding reel 18 and the supplying reel 16 respectively is expressed as follows;

$$\omega_1 + \omega_2 = f(\alpha) = (V/R_0)(1/x + 1/y) \quad (7)$$

The rotational angular velocity obtained by the operation will be called an operational angular velocity and V will be supposed to be a desired tape velocity. A constant of $\beta = R_s/R_0$ will be described later.

The control signal $s_3$ is output as a voltage signal proportional to $f(\alpha)$ and having a voltage value of $v_3$ equaling to $k_1 f(\alpha)$. A value of $k_1$ is a proportional constant set in accordance with the sensitivities of the rotation detectors 24 and 25 and the F/V converter 27 which has a positive polarity when the magnetic tape 13 is required to be transferred in the direction indicated by the arrow A of FIG. 1 and a negative polarity when it is transferred in the reverse direction.

The F/V converter 27 receives the rotation detection signals $s_1$ and $s_2$ to generate an angular velocity summing signal $s_4$ proportional to a sum of the rotation angular velocities (actual angular velocities referred to as hereinbelow) $\omega p_1$, $\omega p_2$ of the reels 18 and 16. Thus, a voltage value $v_4$ of the angular velocity summing signal $s_4$ will be expressed as follows;

$$v_4 = k_2 (\omega p_1 + \omega p_2)$$

It is supposed that the proportional constant of $k_2$ set in accordance with the sensitivities of the rotation detectors 24 and 25 and the F/V converter 27 has a polarity varying in accordance with the transferring direction of the magnetic tape 13. If the magnetic tape 13 moves in the direction indicated by the arrow A of FIG. 1 and the reels 18 and 12 rotate in the directions indicated by the arrows C and D, then the proportional constant $k_2$ has a positive polarity. If the magnetic tape 13 moves in the reverse direction, then it has a negative polarity. Absolute values of the proportional constants of $k_1$ and $k_2$ are equal to each other.

If the magnetic tape 13 is required to be transferred at the desired tape velocity V, then the revolutions of the reels should be controlled so that the sum of the actual angular velocities $wp_1$ and $wp_2$ of the winding reel 18 and the supplying reel 16 detected when they actually rotate corresponds to the sum of rotational angular velocities $w_1$ and $w_2$ determined by the expression (7). This enables the actual tape transfer velocity V to correspond to the desired tape velocity V.

A differential amplifier 28 receives the control signal $s_3$ and the angular velocity summing signal $s_4$ to generate a voltage different signal $s_5$. A reel motor drive circuit 29 drives a reel motor 30 connected to the winding reel 18 and a reel motor 31 connected to the supplying reel 16, respectively in accordance with the input voltage difference signal $s_5$ in a manner described hereinbelow. More particularly, when the polarity of the voltage difference signal $s_5$ is positive, the reel motors are driven so that the magnetic tape 13 is accelerated in the direction indicated by the arrow A of FIG. 1 in accordance with a level of the voltage difference signal $s_5$ while it is accelerated in the direction indicated by the arrow B of FIG. 1 in accordance with a level of the voltage difference signal $s_5$ when its polarity is negative.

It is considered that the magnetic tape 13 has a tape tension applied thereto while it moves.

Thus, it will be noted that the operation circuit of FIG. 2 is such that the control signal $s_3$ from the operation processing circuit 26 becomes equal to the respective velocity summing signal $s_4$ from the F/V converter 27 and that the direction in which the magnetic tape 13 moves varies in accordance with the polarities of the control signal $s_3$.

As noted from the foregoing, the control circuit of FIG. 2 detects the pulses Pt and Ps of the rotation detection signals $s_1$ and $s_2$ and controls so that an actual tape transfer velocity Vp is equal to a desired tape velocity V estimated by the expression (7) in spite of the direction in which the magnetic tape 13 moves by providing the control signal $s_3$ in accordance with the operation of the expression (7).

A method of determining $\beta = R_s/R_o$ will be described hreinbelow.

At the initial state where the leader block 14 is brought into engagement with the recess 17 in the winding reel 18, the operation processing circuit 26 provides a predetermined reference voltage $Vf_3$, but not the voltage $V_3$ equaling $k_1 f(\alpha)$ based on the operation fo the expression (7), to transfer the magnetic tape 13 in the direction of the arrow A of FIG. 1. At the time when the numbers of rotation of the winding reel 18 equal to $C_2a$ and $C_2b$ are detected, and when the numbers of rotation of the C reel 12 equal to $C_1a$ and $C_1b$ are detected, the reference voltage $Vf_3$ stops being output so that the magnetic tape 13 stops being transferred.

The operation processing circuit 26 makes an operation of the expressions (5) and (6) in accordance with the detected rotational numbers $C_1a$, $C_1b$, $C_2a$ and $C_2b$ to determine the winding radius $R_s$ of the C reel 12 and the thickness d of the magnetic tape 13 and makes an operation of $\beta = R_s/R_o$ to enable the operation of the expression (7). It should be noted that the radius $R_0$ of the winding reel 18 is to be previously known.

Although one embodiment of the invention has been illustrated and described with reference to the accompanying drawings, it will be understood by those skilled in the art that it is by way of example, and that various changes and modifications may be made without departing from the spirit and scope of the invention, which is intended to be defined by the appended claims.

What is claimed is:

1. A method of controlling a reel drive so that a magnetic tape is transported from one of first and second reels to the other reel at a desired transport velocity V between them, wherein a first revolution of said first reel indicating variation in a winding number of said magnetic tape on said first reel is expressed by $C_1$, a second revolution of said second reel indicating variation in a winding number of said magnetic tape on said second reel is expressed by $C_2$, and winding radii of said first and second reels are expressed by $R_0$ and $R_s$, respectively, at an initial state at which said first and second revolutions $C_1$ and $C_2$ are zero, said method comprising the steps of:

transferring said magnetic tape from said initial state at which both of said first and second revolutions $C_1$ and $C_2$ are zero to a first winding condition in which said first and second revolutions $C_1$ and $C_2$ become $C_1a$ and $C_2a$, respectively;

transferring said magnetic tape from said first winding condition to a second winding condition in which said first and second revolutions $C_1$ and $C_2$ become $C_1b$ and $C_2b$, respectively;

determining said winding radius Rs of said second reel by substituting said revolutions $C_1a$ and $C_2a$ in said first winding condition and said revolutions $C_1b$ and $C_2b$ in said second winding condition into a following expression:

$$Rs = (H \cdot M - F \cdot N)/(E \cdot H - F \cdot G)$$

wherein E is equal to $2C_2a$, F is equal to $-(C_1a^2 + C_2a^2)$, G is equal to $2C_2b$, H is equal to $-(C_1b^2 + C_2b^2)$, M is equal to $2C_1a \cdot R_0$ and N is equal to $2C_1b \cdot R_0$);

using said winding numbers $C_1$ and $C_2$ and said winding radius $R_s$ to determine a control signal which is proportional to the desired transfer velocity V;

determining an angular velocity summing signal proportional to a sum of actual angular velocities of the reels;

comparing the angular velocity summing signal with the control signal;

generating a voltage difference signal which is proportional to the difference between the angular velocity summing signal and the control signal; and controlling actual transfer velocity of the tape in response to the voltage difference signal.

2. A method of controlling a reel drive in accordance with claim 1, wherein the control signal is proportional to a sum of rotational angular velocities $f(\alpha)$ of the reels determined according to the following expression:

$$f(\alpha) = (V/R_0)(1/x + 1/y)$$

where $$x = (\alpha^2 + 2\alpha\beta - 1)/(\alpha^2 + 1)$$

and $$y = (2\alpha + \beta - \alpha^2\beta)/(\alpha^2 + 1)$$

when $$\alpha = C_2/C_1$$

and $$\beta = R_s/R_0.$$

* * * * *